(12) United States Patent
Huang (10) Patent No.: US 11,818,084 B2
(45) Date of Patent: Nov. 14, 2023

(54) DISPLAY CONTROL METHOD AND ELECTRONIC DEVICE

(71) Applicant: Lenovo (Beijing) Limited, Beijing (CN)

(72) Inventor: Zeyu Huang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/550,776

(22) Filed: Dec. 14, 2021

(65) Prior Publication Data

US 2022/0321505 A1    Oct. 6, 2022

(30) Foreign Application Priority Data

Mar. 30, 2021    (CN) .......................... 202110341706.4

(51) Int. Cl.
*H04L 51/04*    (2022.01)
*H04L 51/216*    (2022.01)

(52) U.S. Cl.
CPC ............ *H04L 51/04* (2013.01); *H04L 51/216* (2022.05)

(58) Field of Classification Search
CPC ....... H04L 51/04; H04L 51/216; H04L 51/52; G06F 9/451
See application file for complete search history.

(56) References Cited

U.S. PATENT DOCUMENTS

| | | | | |
|---|---|---|---|---|
| 2013/0179800 | A1* | 7/2013 | Jeong | H04L 51/216 |
| | | | | 715/752 |
| 2014/0074952 | A1* | 3/2014 | White | G06F 16/285 |
| | | | | 709/206 |
| 2015/0052203 | A1* | 2/2015 | Karnin | H04L 51/42 |
| | | | | 709/206 |
| 2016/0149838 | A1* | 5/2016 | Jeong | H04L 51/04 |
| | | | | 715/753 |
| 2016/0357422 | A1* | 12/2016 | Milden | G06F 3/0488 |
| 2017/0336920 | A1* | 11/2017 | Chan | G06Q 10/10 |
| 2019/0121866 | A1* | 4/2019 | Garg | H04L 51/52 |
| 2019/0132405 | A1* | 5/2019 | Song | H04L 51/043 |
| 2020/0244608 | A1* | 7/2020 | Maierean | H04L 51/066 |
| 2020/0249809 | A1* | 8/2020 | Xia | G06F 3/0485 |
| 2022/0321505 | A1* | 10/2022 | Huang | H04L 51/04 |

FOREIGN PATENT DOCUMENTS

| | | |
|---|---|---|
| CN | 105099891 A | 11/2015 |
| CN | 105553826 A | 5/2016 |
| CN | 108833262 A | 11/2018 |

\* cited by examiner

*Primary Examiner* — Ramy M Osman
(74) *Attorney, Agent, or Firm* — ANOVA LAW GROUP, PLLC (57) ABSTRACT

A processing method includes in response to obtaining, by an electronic apparatus, a conversation message sent by a target conversation object, determining an association degree between a current user of the electronic apparatus and the target conversation object at least based on the current user and an association object of the target conversation object and displaying, at least based on the association degree, the conversation message at a corresponding position of a target interface according to an arrangement rule.

16 Claims, 3 Drawing Sheets

DISPLAY CONTROL METHOD AND ELECTRONIC DEVICE

CROSS-REFERENCE TO RELATED APPLICATION

This application claims priority to Chinese Patent Application No. 202110341706.4, filed on Mar. 30, 2021, the entire content of which is incorporated herein by reference.

TECHNICAL FIELD

The present disclosure generally relates to the information processing field and, more particularly, to an information processing method, device, and electronic apparatus.

BACKGROUND

When a user uses a social tool, the user often joins a plurality of different groups. Messages generated by the groups are displayed at a user terminal. Currently, when a social tool display messages generated by different groups, the messages are displayed according to the sequence of generating the messages. That is, a message generated earlier is displayed first, and a message generated later is displayed later. However, the user pays different attention to the messages generated by these groups. A message generated by a familiar group attracts more attention, and a message generated by an unfamiliar group attracts less attention. However, the current message layout method does not meet the user needs. For example, messages generated by some groups are not important or interesting to the user, and these messages may be arranged at a top position because the messages are generated late. Then, messages generated by groups of interest to the user are not easy to find, which confuses the user.

SUMMARY

Embodiments of the present disclosure provide a processing method. The method includes in response to obtaining, by an electronic apparatus, a conversation message sent by a target conversation object, determining an association degree between a current user of the electronic apparatus and the target conversation object, at least based on the current user and an association object of the target conversation object and displaying, at least based on the association degree, the conversation message at a corresponding position of a target interface according to an arrangement rule.

Embodiments of the present disclosure provide an electronic apparatus, including a processor and a memory. The memory stores an executable program that, when executed by the processor, causes the processor to in response to obtaining, by an electronic apparatus, a conversation message sent by a target conversation object, determine an association degree between a current user of the electronic apparatus and the target conversation object at least based on the current user and an association object of the target conversation object and display, at least based on the association degree, the conversation message at a corresponding position of a target interface according to an arrangement rule.

The beneficial effect of embodiments of the present disclosure includes arranging the conversation messages to be suitable to the use needs of the current user according to the association degree between the current user and the conversation objects and/or the groups. Thus, the important conversation information needed by the current user may be arranged at the notable position. Therefore, the user may view the conversation messages conveniently, and the electronic apparatus may smartly display the conversation messages.

DETAILED DESCRIPTION OF THE EMBODIMENTS

The solutions and features of embodiments of the present disclosure are described with reference to the accompanying drawings.

Various modifications may be made to embodiments of the present disclosure. Therefore, the specification is merely used as an example but is not intended to limit the present disclosure. Those of skill in the art may think of other modifications within the scope and spirit of embodiments of the present disclosure.

The accompanying drawings included in the specification and constituting a part of the specification illustrate some embodiments of the present disclosure. The accompanying drawings together with the general description of the present disclosure and the detailed description of embodiments are used to describe the principle of the present disclosure.

Characteristics of the present disclosure will become apparent from the description of embodiments, which are provided as non-limiting examples, with reference to the accompanying drawings.

Although the present disclosure has been described with reference to some specific examples, those skilled in the art can surely realize many other equivalent forms of the present disclosure.

When combined with the accompanying drawings, aspects, features, and advantages of the present disclosure will become more apparent according to the detailed description.

Specific embodiments of the present disclosure will be described with reference to the accompanying drawings. However, embodiments of the present disclosure are merely examples of the present disclosure, which may be implemented in various methods. Well-known and/or repeated functions and structures are not described in detail to avoid unnecessary or redundant details from obscuring the present disclosure. Therefore, the specific structural and functional details of the present disclosure are not intended to be limiting, but merely serve as the basis and representative basis of the claims to teach those skilled in the art to use the present disclosure in a variety of methods with substantially any suitable detailed structures.

The terms "in one embodiment," "in another embodiment," "in yet another embodiment," or "in other embodiments" used in the present specification may all refer to one or more of the same or different embodiments of the present disclosure.

A processing method of embodiments of the present disclosure may be applied to an electronic apparatus. The method includes arranging conversation messages sent by conversation objects according to an association degree between the user and other conversation objects in the electronic apparatus. Thus, conversation messages having a higher association degree with the user may be arranged in a notable position to facilitate the user to view.

Figure 1:
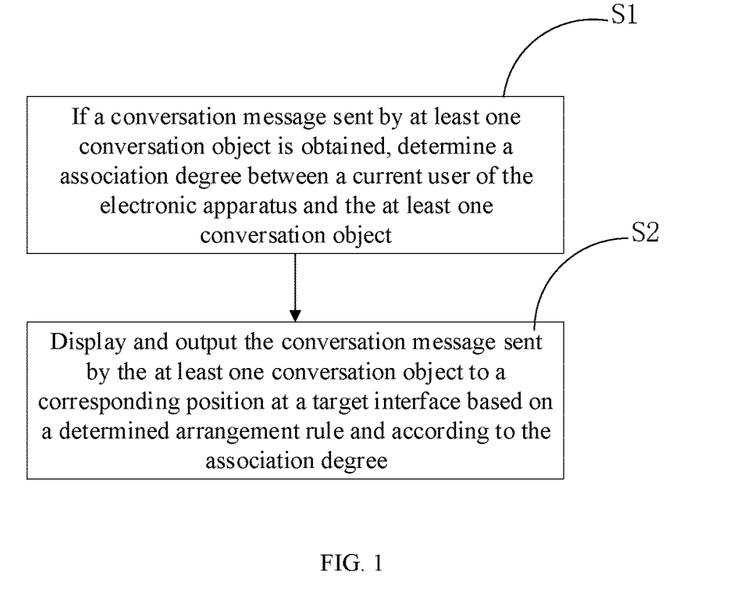
FIG. 1 illustrates a schematic flowchart of a processing method according to some embodiments of the present disclosure.

FIG. 1 illustrates a schematic flowchart of a processing method according to some embodiments of the present disclosure. As shown in FIG. 1, the processing method includes the following processes.

At S1, if a conversation message sent by at least one conversation object is obtained, an association degree between a current user of the electronic apparatus and the at least one conversation object is determined. The at least one conversation object is also referred to as "at least one target conversation object."

The current user may have a conversation with one or more conversation objects through an application of the electronic apparatus. For example, the current user may use the application to have a conversation with other users who also use the application. In some embodiments, other users may correspond to a least one conversation object of the same group (e.g., including one or more conversation objects) in the application. In some other embodiments, the other users may correspond to a plurality of conversation objects of different groups. In still some other embodiments, the other users may correspond to non-group conversation objects (conversation objects not in the conversation groups). In one aspect, the conversation object may have an association relationship with the current user. The association relationship may include a friend relationship, a stranger relationship, a work relationship, a classmate relationship, etc. In another aspect, the group where the conversation object is may also have an association relationship with the current user.

In some embodiments, the current user may have a corresponding association degree with the conversation object based on the one aspect. The current user may also have a corresponding association degree with the group of the conversation object based on the another aspect. That is, the association degree may characterize familiarity of the current user to the associated conversation object and familiarity of the current user to the associated group.

After the electronic apparatus operated by the current user receives the conversation message, the electronic apparatus needs to determine the association degree between the conversation object and/or group corresponding to the conversation message and the current user. The association degree may be different for different conversation objects or groups. For example, for the current user, an association degree corresponding to a family group may be higher than an association degree corresponding to a hobby group. An association degree corresponding to a friend may be higher than an association degree corresponding to a stranger.

At S2, the conversation message sent by the at least one conversation object is displayed and output to a corresponding position at a target interface based on a determined arrangement rule and according to at least the association degree. The association degree is determined at least according to the current user and an association object of the at least one conversation object.

In some embodiments, the association object of the conversation object may represent the association relationship between the conversation object and the current user. For example, the association object of the conversation object may include related information of the group in which the conversation object is, related information of another object of the group in which the conversation object is, or related information of another object and/or group shared between the conversation object and the current user. The association degree may be determined according to the current user and the association object of the at least one conversation object.

Since the association degree represents a degree of how closely the current user contacts the conversation object and/or the group, the conversation message sent by the at least one conversation object may be displayed and output at the corresponding position of the target interface according to the association degree based on the determined arrangement rule. The arrangement rule may be set according to a scene where the user uses the electronic apparatus and/or customized. The target interface may include an interface of the application configured to display conversation messages.

For example, if the use scene of the electronic apparatus includes a working scene, the arrangement rule may be set to a first arrangement rule. The first arrangement rule may include setting an association degree corresponding to the conversation object with a work relationship to a relatively high value and setting an association degree corresponding to the conversation object with a family relationship to a relatively low value. Thus, in the working scene, conversation messages sent by the conversation object with the work relationship may be displayed and output to a notable position at the target interface to attract the attention of the current user. Similarly, when the use scene of the electronic apparatus includes a family scene, the arrangement rule may be set to a second arrangement rule. The second arrangement rule may include setting the association degree corresponding to the conversation object with the family relationship to a relatively high value and setting the association degree corresponding to the conversation object of the work relationship to a relatively low value. Thus, in the family scene, conversation messages sent by the conversation object with the family relationship may be displayed and output to the notable position at the target interface to attract the attention of the current user.

In addition, the conversation message may be a conversation message from a plurality of groups. For the current user, if a group corresponds to a relatively high association degree, the conversation message from the group may be displayed and output to the notable position at the target interface. If the group corresponds to a relatively low association degree for the current user, the conversation message from the group may be displayed and output to a non-notable position at the target interface. Thus, the current user may conveniently view the conversation message that is important to the current user.

This method may arrange the conversation messages according to the association degree between the user and the conversation object and/or group to fit the current user needs. As such, the important conversation messages needed by the current user are arranged in a prominent position, which is convenient for the user to view, so as to realize an intelligence of electronic apparatus for displaying conversation messages.

Figure 2:
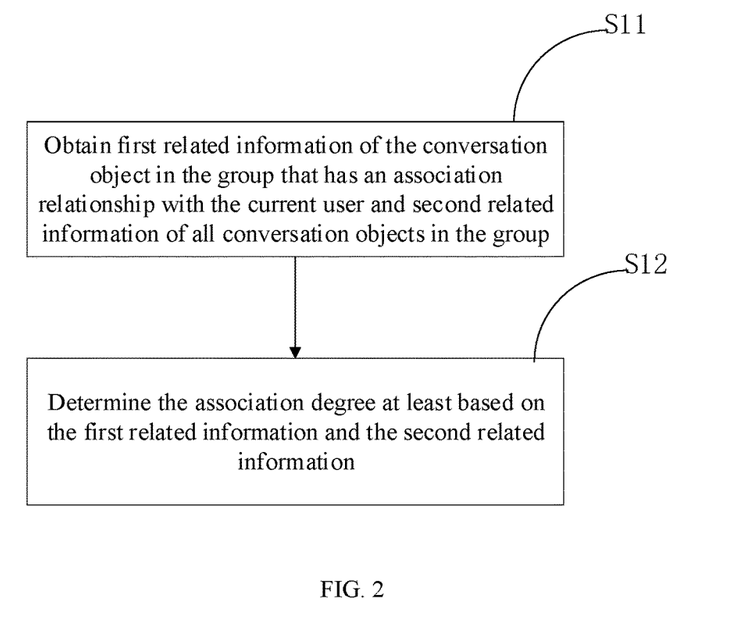
FIG. 2 illustrates a schematic flowchart showing process S1 of FIG. 1 according to some embodiments of the present disclosure.

In embodiments of the present disclosure, as shown in FIG. 2, when the current user and the at least one conversation object are in a same group, determining the association degree between the current user of the electronic apparatus and the at least one conversation object includes the following processes.

At S11, first related information of the conversation object in the group that has an association relationship with the current user and second related information of all conversation objects in the group are obtained.

At S12, the association degree is determined at least based on the first related information and the second related information.

In some embodiments, the current user and the conversation object may be in the same group or different groups (but in the same application). The at least one conversation object may be in the same group as the current user, for example, in a same family group and/or work group, etc. The current user and the conversation object may have the association relationship, such as friendship. The first related information of the conversation object having the association relationship with the current user in the group may include a number of conversation objects in the group that have the association relationship, time when the conversation object forms the association relationship with the current user, etc. For example, the group may include current user A, the first related information may include the number of friends with current user A in the group, and the time when the friend relationship is established.

In addition, the group may further include other conversation objects. In some embodiments, all the conversation objects in the group may include the second related information. The second related information may include a number of conversation objects having the association relationship between all the conversation objects, and the time when the association relationship is formed, etc. For example, if the group includes current user A, user B, user C, user D, and user E, the second relevant information may include the number of friends each user has, and comparison information of the number of the friends, etc. The second related information may also include the time for each user to establish the friend relationship with his friends.

The association degree between the current user and the conversation object and/or associated group may be determined based on the first related information and the second related information. In some embodiments, a predetermined calculation rule may be used, and the first related information and the second related information are used as an input. An output may include the association degree between the current user and the conversation object and/or related group. The association degree may be represented by a specific value.

In embodiments of the present disclosure, the second related information may include the number of the association objects of each of the conversation objects in the group. Obtaining the first related information of the conversation object having the association relationship with the current user in the group and the second related information of all the conversion objects in the group may include obtaining a first number of the conversation objects having the association relationship with the current user in the group and a number of the association objects of each of the conversation objects in the group. The first number is also referred to as a "first object number."

Correspondingly, at least based on the first related information and the second related information, determining the association degree may include, based on the number of the association objects of each of the conversation objects in the group, determining a discrete degree between the conversation objects in the group and at least based on the discrete degree and the first number, determining the association degree.

In some embodiments, when the current user and other users are in the same group, the first related information may include the first number of the conversation objects having the association relationship with the current user. For example, the number of the friends who have a friendship relationship with the current user. Alternatively, the first related information may include the number of names of the conversation objects that are in a contact list of the current user. The number of names in the current user's contact list, etc. The second related information may include the number of the association objects of each conversation object in the group, for example, the number of the friends of each conversation object in the group. Then, the discrete degree between the conversation objects in the group may be determined based on the first related information and the second related information. The discrete degree may reflect a magnitude of a difference between observed individuals, which may also reflect a degree of representativeness of indexes of a distribution center for a value of each observation variable. Then, the association degree of dispersion may be calculated based on the discrete degree and the number of the friends of the current user. The association degree may be represented as a degree of the familiarity of the current user for the conversation object and/or the group. Then, the conversation message sent by at least one conversation object may be displayed and output to a corresponding position of the target interface based on the determined arrangement rule according to the association degree.

Specific processes of calculating the association degree are further described using Table 1 and Table 2 as examples. Table 1 shows an arrangement of the groups associated with the current user sorted according to arrival times of the conversation messages, and Table 2 shows an arrangement of the groups according to the association degrees of the conversation objects and/or groups of the current user. The association degree may include overall familiarity (the overall association degree) of all members (conversation objects) in the group for the current user. The higher the overall familiarity is, the higher the association degree of the current user to the group is. In some embodiments, when the overall familiarity of all the members (conversation objects) in a chat group is relatively high, each member will be more interested in the messages of the chat group. Thus, the conversation messages of the chat group may be displayed at a relatively front position. As shown in Table 2, P is used to represent the overall familiarity of all the members. The larger the value is, the higher the familiarity is. As shown in Table 1, if the groups are only arranged according to the arrival times of the conversation messages, the user cannot conveniently view the conversation messages in the group.

TABLE 1

| | |
|---|---|
| Stranger group 1 | 12:00 |
| Stranger group 2 | 11:00 |
| Stranger group 3 | 10:00 |
| Alumni group | 09:00 |
| Classmate group | 08:00 |

TABLE 2

| | |
|---|---|
| Classmate group | P = 0.9 |
| Alumni group | P = 0.8 |
| Stranger group 3 | P = 0.7 |
| Stranger group 1 | P = 0.6 |
| Stranger group 2 | P = 0.5 |

Further, the overall familiarity may be obtained according to formula 1:

$$P=(E/(N-1))/(s/(N-1)+1)=E/(s+N-1) \quad (1)$$

where, P denotes the overall familiarity, N denotes a total number of nodes, E denotes an expectation of all node values, and s denotes a standard deviation of all the node values.

Figure 3:
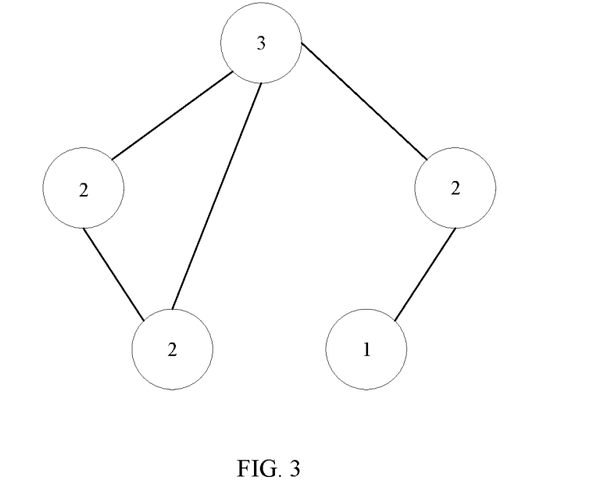
FIG. 3 illustrates a schematic diagram showing a connection relationship of all members in a group according to some embodiments of the present disclosure.
Figure 4:
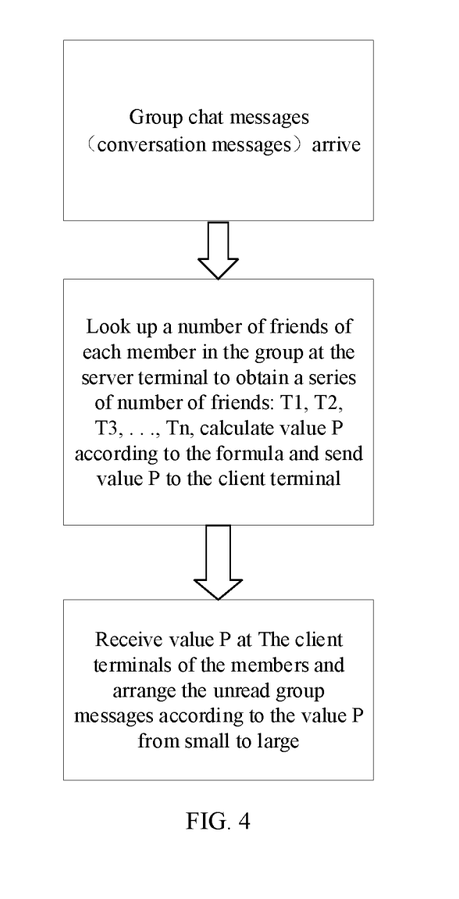
FIG. 4 illustrates a schematic flowchart according to some embodiments of the present disclosure.

With reference to FIGS. 3 and 4, in some embodiments, each node represents a member of each group. The member is the conversation object, which is represented by a structural diagram of the node. Each edge represents the friendship between two members, that is, the association degree is relatively high. The value in the node represents a number of friends of the member in the group. As such, expectation E and standard deviation s of a data group may be calculated. The expectation value represents an average number of friends of each member in the group. The standard deviation represents a discrete degree of the number of friends of each of the members. The expectation value is relatively large and the standard deviation is relatively small, which represents that the average number of friends of each member is relatively large and each of the members has a similar number of friends. Thus, the members of the group are familiar with each other, and the overall familiarity is relatively high. Therefore, the current user has a relatively high association degree with the conversation object and/or the group.

$E/(N-1)$ and $s/(N-1)$ in Formula 1 include normalizing the expectation and standard deviation, respectively, to ensure that the calculated values are comparable. In $s/(N-1)+1$, the operation of adding 1 is to ensure that the denominator is not equal to 0, and at the same time does not affect the comparison of the calculation results.

In embodiments of the present disclosure, determining the association degree between the current user of the electronic apparatus and the at least one conversation object may include the following processes.

In one aspect, if the conversation messages are from different conversation objects of different groups, the method may include separately obtaining a second number of the conversation objects of different groups that have an association relationship with the current user, and a discrete degree between the conversation objects of different groups. Thus, the association degree between the current user and the conversation objects of different groups, which send the conversation messages, may be determined at least based on the discrete degree and the second number. The second number is also referred to as a "second object number."

In some embodiments, for the current user, the conversation messages may be from different groups, in which the current user is. For example, the current user may be in a first group when using the first application. The first application may also include a second group. The second group may also include at least one conversation object. One or more conversation objects of the second group may have an association relationship with the current user, e.g., friendship. In addition, a plurality of conversation objects of the second group may also have an association relationship therebetween. In some embodiments, the method may include obtaining the second number of the conversation objects of the second group that have the association relationship with the current user and the discrete degree between the conversation objects of the second group. The method may be further include determining the association degree between the current user and the conversation object of the second group that send the conversation messages. The association degree may be calculated based on the discrete degree between the conversation objects of the second group and the second number.

In another aspect, if the conversation messages are from a non-group conversation object, the method may include determining the association degree based on at least one of interaction content, historical interaction data, or character attribute relationship between the current user and the non-group conversation object.

In some embodiments, similarly, for the current user, the conversation messages may be from a non-group conversation object. For example, the current user may be in the first group of the first application. The conversation messages may be from a conversation object of another running application. Alternatively, the conversation message may be from a pop-up event message of the first application. The event message is not from the first group or other groups of the first application, but from an official object of the first application. Further, the conversation object may also be an object from another non-group. For the conversation object, the current user may be likely to have had a conversation with the conversation object in a historical time period. In some embodiments, to determine the association degree between the current user and the non-group conversation object, the method may include obtaining at least one of the interaction content, the historical interaction data, or the character attribute relationship to determine the association degree. When information included in the interaction content is very important to the current user, the association degree (which may be represented by a specific value) may be increased accordingly. If the historical interaction data shows that the current user has a relatively high historical association degree with the conversation object, the current association degree may be increased accordingly. In addition, the character attribute relationship may be the attribute of the conversation object. If an attribute identifier of the character attribute relationship shows that the identity of the conversation object is the girlfriend of the current user, then the association degree of the conversation object may be relatively high.

In another aspect, if the conversation messages are from a non-group conversation object and a group conversation object, the method may include determining the association degree at least based on the discrete degree between group conversation objects, the number of the conversation objects of the group that have the association relationship with the current user, and the interaction content, the historical interaction data, or the character attribute relationship between the current user and the non-group conversation object.

In some embodiments, for the current user, the conversation messages may be from different initiators, including non-group conversation objects and group conversation objects. For example, when the current user is in the first group of the first application, the conversation message may be from the first group or another non-group. To determine the association degree between the current user and the conversation object that sent the conversation message more accurately, the method may include determining the association degree at least based on the discrete degree between the conversation objects of the first group, the number of the conversation objects of the first group that have the association relationship with the current user, and the interaction content, the historical interaction data, or the character attribute relationship between the current user and the non-group conversation object. Thus, an accurate value may be obtained.

In embodiments of the present disclosure, displaying and outputting the conversation message sent by the at least one conversation object to the corresponding position of the target interface based on the determined arrangement rule and at least according to the association degree may include, based on parameters that characterizes the association degree, displaying the corresponding conversation message according to an order at the corresponding position of the target interface, or based on the parameters that characterize the association degree and the generation time of the conversation message, displaying the conversation message according to an order at the corresponding position of the target interface.

In some embodiments, the parameters that characterize the association degree may be represented by various forms, including a specific value, a level, etc. In one aspect, the corresponding conversation message may be displayed at the target interface according to the parameters. For example, the corresponding message may be displayed according to the specific value of the association degree. The higher the value is, the more notable the position where the corresponding message is displayed is at the target interface. For example, the conversation message may be displayed in sequence. The sequence may be based on the sizes of the specific values of the association degree of the conversation objects where the conversation messages are from. A conversation message corresponding to a greater value may be arranged more at the front.

In another aspect, the generation time of the plurality of conversation messages is different. While the parameters that characterize the association degree is considered. the generation time of the conversation messages may also be considered. The conversation messages may be displayed in sequence by combining the parameters and the generation time. For example, the values of the association degrees between the conversation objects of two conversation messages and the current user may be same, but the generation time is different. Then, the conversation message with the earlier generation time may be displayed at the front or upper notable position of the target interface. The conversation message with relatively late generation time may be displayed at the back or lower position of the target interface. Thus, the user may view the messages conveniently.

In embodiments of the present disclosure, the target interface may include a working interface and a lock screen interface of the electronic apparatus. The method may further include adjusting the arrangement rule based on the identity of the target interface.

In some embodiments, the target interface may include an interface displayed at the electronic apparatus, including the working interface and the lock screen interface of the electronic apparatus. The working interface may include an interface through which the application program runs when the electronic apparatus is being operated. The lock screen interface may include an interface after the electronic apparatus is locked and cannot be operated randomly.

In embodiments of the present disclosure, when the target interface include the working interface, displaying and outputting the conversation message sent by the at least one conversation object at the corresponding position of the target interface based on the determined arrangement rule and according to the association degree includes displaying the conversation message at the corresponding position of the target interface based on the arrangement rule and generating instruction information for adjusting the arrangement rule. Each of the target interfaces may correspondingly display the corresponding generation time.

In some embodiments, the arrangement rule may include arranging the conversation objects corresponding to a relatively high association degree at the upper or front notable position of the target interface. When the target interface includes the working interface, the conversation message may be displayed at the corresponding position of the target interface based on the arrangement rule. Each target interface may correspondingly display the corresponding generation time. The user may view the generation time or adjust a display mode of the generation time. In addition, the instruction information for adjusting the arrangement rules may be generated in the target interface. Thus, the user may be instructed to adjust the arrangement rules according to actual needs. For example, the original arrangement rule may include arranging the conversation messages based on an associated program, which may also be adjusted to arrange the conversation messages according to the sequence of the generation time to satisfy different user needs.

Figure 5:
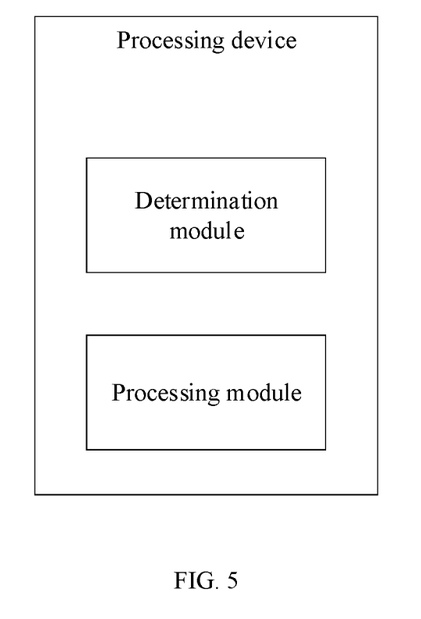
FIG. 5 illustrates a schematic structural block diagram of an electronic apparatus according to some embodiments of the present disclosure.

Embodiments of the present disclosure also provide a processing device. As shown in FIG. 5, the processing device includes a determination module and a processing module.

The determination module may be configured to, if a conversation message sent by at least one conversation object is obtained, determine an association degree between a current user of the electronic apparatus and the at least one conversation object. The at least one conversation object is also referred to as "at least one target conversation object."

In some embodiments, the current user may have a conversation with one or more conversation objects through the application in the electronic apparatus. For example, the current user may use the application to have a conversation with other users who also use the application. In some embodiments, other users may correspond to the at least one conversation object in the same group (e.g., including one or more conversation objects) of the application. In some other embodiments, the other users may correspond to a plurality of conversation objects of different groups. In still some other embodiments, the other users may correspond to non-group conversation objects. In one aspect, the conversation object may have an association relationship with the current user. The association relationship may include a friend relationship, a stranger relationship, a work relationship, a classmate relationship, etc. In another aspect, the group in which the conversation object is may also have an association relationship with the current user.

In some embodiments, the current user and the conversation object may correspond to the corresponding association degree based on the one aspect. The current user may also have the corresponding association degree with the group of the conversation object based on the another aspect. That is, the association degree may represent the familiarity of the current user to the associated conversation object and the familiarity of the current user to the associated group.

After the electronic apparatus operated by the current user receives the conversation message, the determination module may need to determine the association degree between the conversation object and/or group corresponding to the conversation message and the current user. The association degree may be different for different conversation objects or groups. For example, for the current user, the association degree corresponding to the family group may be higher than the association degree corresponding to the hobby group. The association degree corresponding to a friend may be higher than the association degree corresponding to a stranger.

The processing module may be configured to display and output the conversation message sent by the at least one conversation object to the corresponding position of the target interface based on the determined arrangement rule and according to at least the association degree. The association degree may be determined at least according to the current user and the association object of the at least one conversation object.

In some embodiments, the association object of the conversation object may represent the association relationship between the conversation object and the current user. For example, the association object of the conversation object may include related information of the group in which the conversation object is, related information of another object of the group in which the conversation object is, or related information of another object and/or group shared between the conversation object and the current user. The association degree may be determined according to the current user and the association object of the at least one conversation object.

Since the association degree represents the degree of how closely the current user contacts the conversation object and/or the group, the processing module may be configured to display and output the conversation message sent by the at least one conversation object at the corresponding position of the target interface according to the association degree based on the determined arrangement rule. The arrangement rule may be set according to the scene where the user uses the electronic apparatus and/or customized. The target interface may include an interface of the application configured to display conversation messages.

For example, if the use scene of the electronic apparatus includes the working scene, the arrangement rule may be set to the first arrangement rule. The first arrangement rule may include setting an association degree corresponding to the conversation object with a work relationship to a relatively high value. The processing module may be configured to set an association degree corresponding to the conversation object with a family relationship to a relatively low value. Thus, in the working scene, the processing module may be configured to display and output the conversation message sent by the conversation object with the work relationship to the notable position at the target interface to attract attention of the current user. Similarly, when the use scene of the electronic apparatus includes the family scene, the arrangement rule may be set to the second arrangement rule. The second arrangement rule may include setting the association degree corresponding to the conversation object with the family relationship to a relatively high value. The processing module may be configured to set the association degree corresponding to the conversation object of the work relationship to a relatively low value. Thus, in the family scene, conversation messages sent by the conversation object with the family relationship may be displayed and output to the notable position at the target interface to attract the attention of the current user.

In addition, the conversation messages may be conversation messages from a plurality of groups. For the current user, if a group corresponds to a relatively high association degree, the conversation message from the group may be displayed and output to the notable position at the target interface. If the group corresponds to a relatively low association degree for the current user, the conversation message from the group may be displayed and output to a non-notable position at the target interface. Thus, the current user may conveniently view the conversation message that is important to the current user.

In embodiments of the present disclosure, when the current user and the at least one conversation object are in a same group, the determination module may be further configured to obtain first related information of the conversation objects in the group that have the association relationship with the current user and the second related information of all the conversation objects in the group and determine the association degree at least based on the first related information and the second related information.

In embodiments of the present disclosure, the second related information may include the number of the association objects of each of the conversation objects in the group. The determination module may be further configured to obtain the first number of the conversation objects in the group that have the association relationship with the current user and the number of the association objects for each of the conversation objects in the group. The first number is also referred to as a "first object number."

Correspondingly, determining the association degree at least based on the first related information and the second related information includes determining the discrete degree between the conversation objects in the group based on the number of the association objects of each of the conversation objects in the group and determining the association degree at least based on the discrete degree and the first number.

In embodiments of the present disclosure, the determination module may be further configured to, if the conversation messages are from different conversation objects in different groups, obtain the second number of the conversation objects of different groups that have the association relationship with the current user and the discrete degree between the conversation objects of different groups to determine the association degrees between the current user and the conversation objects sending the conversation messages of different groups based on the discrete degree and the second number.

In some other embodiments, if the conversation messages are from a non-group conversation object, the determination module may be further configured to determine the association degree based on at least one of the interaction content, the historical interaction data, or the character attribute relationship between the current user and the non-group conversation object.

In still some other embodiments, if the conversation messages are from the non-group conversation objects and the group conversation objects, the determination module may be further configured to determine the association degree at least based on the discrete degree between the group conversation objects, the number of the conversation objects in the group that have the association relationship with the current user, and the interaction content, the historical interaction data, or the character attribute relationship between the current user and the non-group conversation object. The second number is also referred to as a "second object number."

In embodiments of the present disclosure, the processing module may be further configured to, based on the parameters that characterize the association degree, display the corresponding conversation messages sequentially at the corresponding positions of the target interface. In some other embodiments, the processing module may be further configured to, based on the parameters that characterize the association degree and the generation time of the conversation messages, display the conversation messages sequentially displayed at the corresponding positions of the target interface.

In embodiments of the present disclosure, the target interface may include the working interface and the lock screen interface of the electronic apparatus. The processing module may be further configured to adjust the arrangement rule based on the identity of the target interface.

In embodiments of the present disclosure, when the target interface is the working interface, the processing module may be further configured to display the conversation messages at the corresponding positions of the target interface based on the arrangement rule and generate the instruction information for adjusting the arrangement rule. Each of the target interfaces may correspondingly display the corresponding generation time.

In embodiments of the present disclosure, when the target interface is the lock screen interface, the processing module may be further configured to, based on the association degree, select some of the conversation messages with the association degrees higher than a predetermined value to display at the target interface and/or generate a prompt message to prompt whether to view a conversation message that is not displayed.

Figure 6:
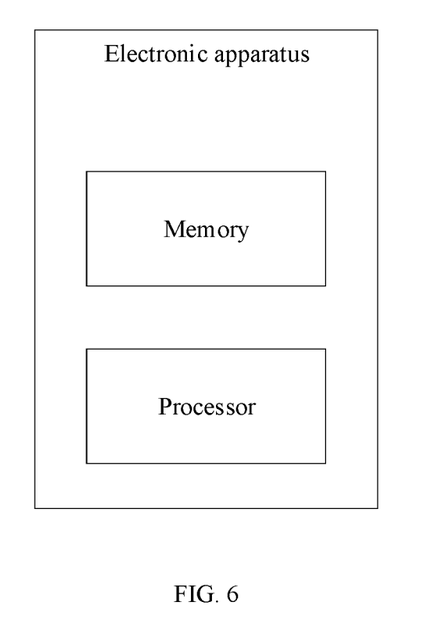
FIG. 6 illustrates a schematic structural block diagram of the electronic apparatus according to some other embodiments of the present disclosure.

Embodiments of the present disclosure further provide an electronic apparatus. As shown in FIG. 6, the electronic apparatus includes a processor and a memory. The memory stores an executable program. The processor may execute the executable program to perform the following processes.

If a conversation message sent by at least one conversation object is obtained, the association degree is determined between the current user of the electronic apparatus and the at least one conversation object.

The conversation messages sent by the at least one conversation object are displayed and output at the corresponding positions of the target interface based on the determined arrangement rule and at least according to the association degree.

The association degree is determined at least according to the current user and the association object of the at least one conversation object.

Embodiments of the present disclosure further provide a storage medium. The storage medium may store a computer program that, when executed by the processor, causes the processor to implement the following processes.

If a conversation message sent by at least one conversation object is obtained, the association degree is determined between the current user of the electronic apparatus and the at least one conversation object.

The conversation messages sent by the at least one conversation object are displayed and output at the corresponding positions of the target interface based on the determined arrangement rule and at least according to the association degree.

The association degree is determined at least according to the current user and the association object of the at least one conversation object.

The above embodiments are only exemplary embodiments of the disclosure and are not used to limit the present disclosure. The scope of the present disclosure is defined by the claims. Those skilled in the art may make various modifications or equivalent substitutions to the present disclosure within the essence and the scope of the present disclosure. The modifications or the equivalent substitutions should be within the scope of the present disclosure.

What is claimed is:

1. A processing method comprising:
in response to obtaining, by an electronic apparatus, a conversation message sent by a target conversation object, determining an association degree between a current user of the electronic apparatus and the target conversation object at least based on the current user and an association object of the target conversation object; and
displaying, at least based on the association degree, the conversation message at a corresponding position of a target interface according to an arrangement rule;
wherein:
the conversation message is one of a plurality of candidate conversation messages from a plurality of candidate conversation objects, the plurality of candidate conversation objects including one or more non-group conversation objects and one or more group conversation objects in one or more groups;
the target conversation object is one of the one or more group conversation objects that is in a same target group as the current user;
determining the association degree between the current user and the target conversation object includes:
obtaining first related information of one or more conversation objects in the target group that have an association relationship with the current user and second related information of all conversation objects in the target group; and
determining the association degree between the current user and the target conversation object based on the first related information and the second related information; and
determining the association degree between the current user and the target conversation object further includes determining association degrees between the current user and the plurality of candidate conversation objects at least based on:
a discrete degree between the group conversation objects,
a number of the conversation objects in the one or more groups that have the association relationship with the current user, and
at least one of interaction content, historical interaction data, or character attribute relationship, between the current user and the non-group conversation objects.

2. The method of claim 1, wherein:
the second related information includes a number of association objects of each conversation object in the target group; and
obtaining the first related information and the second related information includes:
obtaining a target number of the one or more conversation objects in the target group that have the association relationship with the current user and the number of the association objects of each conversation object in the target group;
determining the association degree between the current user and the target conversation object based on the first related information and the second related information includes:
determining a discrete degree between the conversation objects in the target group based on the number of the association objects of each conversation object in the target group; and determining the association degree based on the target number and the discrete degree between the conversation objects in the target group.

3. The method of claim 1, wherein:
the conversation message is one of conversation messages from different target conversation objects of different groups; and
determining the association degree between the current user and the target conversation object includes:
obtaining a target number of conversation objects in each of the different groups that have an association relationship with the current user and a discrete degree between conversation objects in each of the different groups; and
determining an association degree between the current user and each target object of the plurality of target conversation objects at least based on the discrete degree and the target number of the each target object.

4. The method of claim 1, wherein displaying the conversation message at the corresponding position of the target interface includes:
displaying the conversation message at the corresponding position of the target interface according to an order based on at least one of a parameter representing the association degree or a generation time of the conversation message.

5. The method of claim 1,
wherein the target interface includes a working interface and a lock screen interface of the electronic apparatus;
the method further comprising:
adjusting the arrangement rule based on an identity of the target interface.

6. The method of claim 5, wherein:
the target interface is the working interface; and
displaying the conversation message at the corresponding position of the target interface includes at least one of:
displaying the conversation message at the corresponding position of the target interface based on the arrangement rule, and displaying a corresponding generation time on the target interface; or
generating indication information for adjusting the arrangement rule.

7. The method of claim 5, wherein:
the target interface is the lock screen interface; and
displaying the conversation message at the corresponding position of the target interface includes at least one of:
displaying the conversation message at the target interface in response to the association degree being higher than a predetermined value; or
generating prompt information to prompt whether to non-displayed conversation message.

8. The processing method of claim 1, wherein:
the target group further includes a conversation object other than the current user and the target conversation object; and
the first related information includes a number of the conversation objects of the target group being in a contact list of the current user, and the second related information includes a number of the conversation objects of the target group being in a contact list of the target conversation object, and a number of the conversation objects of the target group being in a contact list of the conversation object other than the current user and the target conversation object.

9. The processing method of claim 8, wherein determining the association degree between the current user and the target conversation object based on the first related information and the second related information includes:
obtaining an average of the number of the conversation objects of the target group being in the contact list of the current user, the number of the conversation objects of the target group being in the contact list of the target conversation object, and the number of the conversation objects of the target group being in the contact list of the conversation object other than the current user and the target conversation object;
obtaining a standard deviation of the number of the conversation objects of the target group being in the contact list of the current user, the number of the conversation objects of the target group being in the contact list of the target conversation object, and the number of the conversation objects of the target group being in the contact list of the conversation object other than the current user and the target conversation object; and
determining the association degree between the current user and the target conversation object based on the average and the standard deviation.

10. The processing method of claim 1, wherein the arrangement rule includes displaying the conversation message with a first association degree in front of the conversation message with a second association degree, the first association degree being greater than the second association degree.

11. An electronic apparatus comprising:
a processor; and
a memory storing an executable program that, when executed by the processor, causes the processor to:
in response to obtaining, by an electronic apparatus, a conversation message sent by a target conversation object, determine an association degree between a current user of the electronic apparatus and the target conversation object at least based on the current user and an association object of the target conversation object; and
display, at least based on the association degree, the conversation message at a corresponding position of a target interface according to an arrangement rule;
wherein:
the conversation message is one of a plurality of candidate conversation messages from a plurality of candidate conversation objects, the plurality of candidate conversation objects including one or more non-group conversation objects and one or more group conversation objects in one or more groups;
the target conversation object is one of the one or more group conversation objects that is in a same target group as the current user;
the program further causes the processor to:
obtain first related information of one or more conversation objects in the group that have an association relationship with the current user and second related information of all conversation objects in the group;
determine the association degree between the current user and the target conversation object based on the first related information and the second related information; and
determine association degrees between the current user and the plurality of candidate conversation objects at least based on:
a discrete degree between the group conversation objects, a number of the conversation objects in the one or more groups that have the association relationship with the current user, and at least one of interaction content, historical interaction data, or character attribute relationship, between the current user and the non-group conversation objects.

12. The electronic apparatus of claim 11, wherein:
the second related information includes a number of association objects of each conversation object in the target group; and
the program further causes the processor to:
obtain a target number of the one or more conversation objects in the target group that have the association relationship with the current user and the number of the association objects of each conversation object in the target group;
determine a discrete degree between the conversation objects in the target group based on the number of the association objects of each conversation object in the target group; and
determine the association degree based on the target number and the discrete degree between the conversation objects in the target group.

13. The electronic apparatus of claim 11, wherein:
the conversation message is one of conversation messages from different target conversation objects of different groups; and
the program further causes the processor to:
obtain a target number of conversation objects in each of the different groups that have an association relationship with the current user and a discrete degree between conversation objects in each of the different groups; and
determine an association degree between the current user and each target object of the plurality of target conversation objects at least based on the discrete degree and the target number of the each target object.

14. The electronic apparatus of claim 11, wherein the program further causes the processor to:
display the conversation message at the corresponding position of the target interface according to an order based on at least one of a parameter representing the association degree or a generation time of the conversation message.

15. The electronic apparatus of claim 11, wherein:
the target interface includes a working interface and a lock screen interface of the electronic apparatus; and
the program further causes the processor caused to:
adjust the arrangement rule based on an identity of the target interface.

16. The electronic apparatus of claim 15, wherein:
the target interface is the working interface; and
the program further causes the processor to perform at least one of:
displaying the conversation message at the corresponding position of the target interface based on the arrangement rule, and displaying a corresponding generation time on the target interface; or
generating indication information for adjusting the arrangement rule.

* * * * *